(12) United States Patent
Rohatgi

(10) Patent No.: US 6,701,434 B1
(45) Date of Patent: Mar. 2, 2004

(54) EFFICIENT HYBRID PUBLIC KEY SIGNATURE SCHEME

(75) Inventor: Pankaj Rohatgi, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/307,493

(22) Filed: May 7, 1999

(51) Int. Cl.[7] .............................. H04L 9/30; G06F 1/02; G06F 19/00
(52) U.S. Cl. ........................ 713/168; 713/156; 713/170; 713/177; 713/179; 380/28; 380/30; 380/46; 380/277; 705/37
(58) Field of Search ........................ 380/277, 28, 30, 380/46; 713/168, 177, 170, 156, 179; 705/37

(56) References Cited

U.S. PATENT DOCUMENTS

| | | | | |
|---|---|---|---|---|
| 4,309,569 A | * | 1/1982 | Merkle | 178/22.08 |
| 4,926,479 A | * | 5/1990 | Goldwasser et al. | 380/23 |
| 5,432,852 A | * | 7/1995 | Leighton et al. | 380/30 |
| 5,604,804 A | * | 2/1997 | Micali | 380/25 |
| 5,608,801 A | * | 3/1997 | Aiello et al. | 380/46 |
| 5,625,693 A | * | 4/1997 | Rohatgi et al. | 380/23 |
| 5,646,997 A | * | 7/1997 | Barton | 380/23 |
| 5,754,659 A | * | 5/1998 | Sprunk et al. | 380/30 |
| 6,021,491 A | * | 2/2000 | Renaud | 713/179 |
| 6,055,518 A | * | 4/2000 | Franklin et al. | 705/37 |
| 6,226,743 B1 | * | 5/2001 | Naor et al. | 713/177 |
| 6,311,271 B1 | * | 10/2001 | Gennaro et al. | 713/170 |
| 6,532,540 B1 | * | 3/2003 | Kocher | 713/156 |
| 2003/0009666 A1 | * | 1/2002 | Jakobsson | 713/168 |

OTHER PUBLICATIONS

Ralph C. Merkle, A Certified Digital Sinature, Advances in CRyptology–CRYPTO '89, LNCS 435, pp. 218–238, 1990.*

Rohatgi Pankaj et al, How to Sign Dlgital Signature, I.B.M. T.J. Watson Reseach, Feb. 24, 1998.*

Sivio Micali et al., On–Line/Off–Line Digital Signature, Proceedings of Crypto89.*

Digital Signature for Flows and Multicast, Chung Kei Wong et al., Department of Computer Sciences, The University of Texas a Austin, Jun. 14, 1999.*

Adrian Perrig, The BiBa One–Time Signature And Broadcasr Authentication Protocol, University of California, Berkeley, Digital Fountain, ACM 1–58113–385–5/01/0011, 2001.*

(List continued on next page.)

*Primary Examiner*—Frantz B. Jean
*Assistant Examiner*—Taghi T Arani
(74) *Attorney, Agent, or Firm*—Louis P Herzberg

(57) ABSTRACT

Methods, apparatus and computer products provide solutions to the problem caused by the slow speed of public key signature algorithms. The solutions also solve problems of packet authentication for multicast and other scenarios requiring fast, compact digital signatures. Security guarantees required for packet authentication are provided in a way that can handle multiple independent flows, produces authentication fields of fixed size, works in the fully unreliable setting, does not require any packet delays and has the additional property of being able to withstand and smooth over irregular processor loading and bursty packet output rate. One aspect of the present invention uses a hybrid approach consisting of the signer creating a certificate for the public key of an efficient k-time signature scheme using a regular signature key. The signer then signing up to k messages with the private key corresponding to k-time public key. The time consumed to compute a public key signature is amortized over k signatures. These and other aspects are provided in a signature scheme wherein a commitment is employed.

71 Claims, 8 Drawing Sheets

OTHER PUBLICATIONS

Josh Benaloh, One–Way Accumulators: A Decentralized Alternative to Digital Sinatures, Advances in Cryptology Eurocrypt '93 LNCS, vol. 765, pp. 274–285, Springer–Verlag, 1994.*

Marcel Waldvogel et al., The VersaKey Framework: Versatile Group Key Management, IEEE Journal on Selected Areas in Communications, vol. 17, No. 9, Sep. 1999.*

J. Black et al., UMAC: Fast and Secure Message Authentication, Advances in Cryptology—CRYPTO '99 [7].*

Philip Rogaway et al., Collision–Resistant Hashing: Towards Making UOWHFs Practical, Lecture Notes in Computer Science vol. 1294, B. Kaliski ed., Springer–Verlag 1997.*

Mihir Bellare et al., Keying Hash Functions for Message Authentication (preliminary version), Most recent version available via http://www.research.ibm.com/security/keyed–md5.html.*

Moni Naor et al., Universal One–way Hash Functions and their Cryptographic, IBM Almaden Research Center, Revised Mar., 1995.*

Adrial Perrig et al., The TESLA Broadcast Authentication P{rotocol, Cryptobytes, RSA Laboratories, vol. 5, No. 2, Summer/Fall 2002.*

Bruce, Schneier, Applied Cryptography, Second Edition, pp. 185–187, Published by John Wiley & Sons, INC, 1996.*

* cited by examiner

EFFICIENT HYBRID PUBLIC KEY SIGNATURE SCHEME

CROSS REFERENCES

The present application is related to the following application Ser. No. 60/133,163 even dated herewith, entitled, "Commitments in Signatures," by inventor Pankaj Rohatgi, and is included herein by reference in entirety.

FIELD OF THE INVENTION

The present invention is directed to the field of cryptography. It is more specifically related to the field of digital signature technology.

BACKGROUND OF THE INVENTION

A digital signature is a fundamental cryptographic primitive which, in the digital setting, generally serves the same purpose as a handwritten signature in the real world setting. Namely, it binds, in an unforgeable, non-repudiable manner, the identity of the signer to the information being signed.

The mechanisms of applying and using public-key based digital signature technology however, are quite different than those used for handwritten signatures. Firstly the digital signature itself is a mathematical function of the message being signed and a private key known only to the signer. Thus, unlike a handwritten signatures, every digital signature employed by an entity is very different from its other signatures, since the underlying message being signed is likely to be different. Verification of a digital signature, therefore, is also very different from its handwritten counterpart. Instead of examining the similarity between the signature on a message and a sample signature of the signer, the verifier applies a mathematical function on the message, the signature and a publicly known key of the signer. The publicly known key is known to correspond to the signer's privately held key. The system works as long as it is infeasible to compute the private key from the publicly known key, and without the private key it is infeasible to compute the signature on any new message. Therefore, whereas everyone is able to verify the signatures using the public key, only the owner of the private key can compute digital signatures.

The above is a description of how public key signatures work in theory. However, to make such signatures useful in practice, several additional steps, cryptographic primitives and infrastructure are required. We now describe some of these additional steps, primitives and infrastructure since they have a direct bearing on this invention.

From the description of the generation, signing and verification process above, it should be clear that a digital signature only binds the signature to the owner of a private key corresponding to the public key used in the verification process. Since private-public key pairs are just mathematical objects which can be generated by anyone, to serve any useful legal and/or other purpose, there should also be a binding between the public key and the real-world identity of the owner of the corresponding private key. In practice this is done by means of another digital object called a public key certificate. The certificate (or chain of certificates) is essentially a statement binding the real-world identity of a signer with a public key, together with a digital signature (or chain of digital signatures) from a trusted entity vouching for the veracity of the binding statement. The trusted entity is referred to as a certification authority. Since the certification authority's public key is well known, this provides a way for another entity which trusts the certification authority, to verify that indeed the signer with a certain real-life identity is in possession of the private key corresponding to the public key. This other entity can verify the binding between the signer's identity and public key by verifying the certification authority's signature on the binding object.

There is yet another important practical issue relating to the use of digital signatures. In popular public key signature schemes such as the RSA algorithm, the DSA algorithm etc, once the public/private key for a signer is chosen, the core signature algorithm can only be applied to message blocks of a certain fixed size. However, it is impractical for entities to have multiple certified public keys for all possible message block sizes. Also, computing signatures for very large message-block sizes is very time consuming. In practice, core signature schemes are used in conjunction with another cryptographic primitive known as a cryptographic hash function. A cryptographic hash function is a publicly known function that takes in an arbitrary sized message as an argument and produces a fixed sized output. This output is said to be the cryptographic hash of the message. The hash function has a property of being collision resistant. A function is collision resistant if it is infeasible to come up with two different inputs upon which the function produces the same output. Examples of cryptographic hash functions include SHA-1 and MD5 which produce 160-bit and 128-bits outputs respectively.

With a collision resistant hash function, a signer can sign any arbitrarily sized message with a single private key by applying the signature algorithm only to the cryptographic hash of the message. Similarly, a verifier can verify a signature on a message by applying the signature verification algorithm on the cryptographic hash of the message. Since it is infeasible for anybody (including the signer, the verifier or any other third party) to compute two different messages which have the same cryptographic hash, with respect to unforgeability and non-repudiation, a signature on the hash behaves like a signature on the actual message.

In many cases, another cryptographic primitive called a Target Collision Resistant (TCR) hash function can be used in the place of collision resistant hash function in the signature compution process for arbitrary messages. TCR hash functions may be referred to as universal one-way hash functions. Target Collision Resistance can be viewed as a weaker requirement than collision resistance, but is nevertheless considered to be good enough for signatures. A target collision resistant function is a publicly known function that takes as input a fixed sized message and a fixed sized key and produces an output of some fixed size. The cryptographic property required of a TCR function T is that given its description, it is infeasible for someone to come up with any message M1, such that, when the function T is computed with a randomly chosen key K, it becomes feasible for that someone to compute some other message M2, such that the value of T on M1 and K coincides with the value of T on M2 and K. The point to note in the definition of a TCR function is that the key K is randomly chosen only after M1 has been chosen. Indeed, it is quite possible that if K were to be chosen first then it may be quite easy to produce a collision, i.e., two messages M1 and M2 such that T on K and M1 coincides with T on K and M2. Thus, the TCR requirements of a function are less burdensome than the requirements of collision resistance from a keyless function which prohibits easy computation for any collision whatsoever. Therefore, candidates for TCR functions are expected to be easier to design than candidates for collision resistant hash functions.

TCR functions are suitable for use in signatures in the following way. In order to sign a message m, which in the most general setting could have been chosen by someone other than the signer, the signer randomly picks a key k, computes the TCR function on m and k and then signs the output resulting from applying the TCR function together with k using any available digital signature scheme. If the available digital signature scheme is unforgeable, then the scheme involving TCR function retains the property that it is not feasible for anyone else to forge signatures based on it. Hence they cannot be repudiated. It should be noted that in the case of TCR based signatures, the signer can come up with two different messages which have the same signature by choosing the messages after choosing the key to the TCR function, whereas in the case of collision-resistant hash functions, even the signer cannot do so.

We now briefly describe another cryptographic primitive known as a commitment scheme. Although, prior to the present invention commitment schemes are unrelated to digital signatures, they are described here, since they will be shown to be relevant to the present invention.

A commitment scheme is a two stage protocol involving a committer and one or several verifiers. Informally, the goal of a commitment protocol is to model some of the properties of a sealed box or envelope in real-life. The sealed box may, for example, include a commiters bid for an object. At the first stage of the protocol, the verifiers are interested in having the entity/committer irrevocably make a choice from a set of options. The committer is amenable to making such a choice but at this stage does not want the verifiers to know what choice he has made. This situation often arise in real-life in situations in which a party (commiter) wants to make a bid for an object without disclosing the bid to anyone else. Everyone participating in the bidding would require that each party commit themselves to the bid so that no-one should be able to change their bids at a later time. The committer then follows the commitment protocol and produces a digital message, known as a commitment. This commitment message has the property that it forever binds the committer to a choice or bid, without disclosing any information about the specific choice the committer has made. This process is analogous, in the real-world to the committer writing his choice on piece of paper and putting the paper in a publicly displayed opaque envelope or box and either sealing the envelope or locking the box. At a later time, when all parties are interested in publicizing the committed choice, the committer produces a committment opening string which together with the commitment message reveals the choice that was originally committed. This in real-life would correspond to the commiter opening the seal or lock to reveal the contents of the envelope/box. This type of commitment is hereinafter referred to as a regular-commitment. (The reason being that this invention will describe a new cryptographic primitive which will be termed a TCR-commitment, which is very similar to a regular-commitment but nevertheless has slightly weaker properties.)

After having described public key signatures, cryptograpic hash functions, TCR functions and regular-commitment schemes we now describe some of the shortcomings of current digital signature technology which the present invention addresses.

One of the main drawbacks of current digital signature technology which prevents its deployment in many applications is performance. Public key signatures using acceptable algorithms and key-lengths are very compute-intensive to generate and/or to verify. For example, even a high end workstation such as a 200 MHz PowerPC 604e based RS/6000 can generate only 50 or so 1024 bit RSA signatures per second. For many applications such a rate is unacceptably slow.

One such application is secure-multicast. In multicast, a sender can send a single packet to a group of recipients over a network. The network is responsible for delivering the packet to all recipients in the group. Multicast generally permits a far more efficient usage of network bandwidth than the alternative unicast approach in which the sender sends the same packet individually to each of the recipients.

Now consider the problem of authenticating the sender of a multicast packet. In the case of unicast, the sender can append a message authentication code (MAC) to the packet using a key it shares with the recipient. In the case of multicast this does not work since the MAC key would have to be known by all recipients and therefore any recipient can masquerade as the sender. The security exposure of using MACs for authentication in multicast can be significant especially if the multicast group is very large. An approach to solve this problem from a security perspective requires the sender to digitally sign each packet. Any recipient would then be able to authenticate the packet without having the ability to masquerade as the sender. However, due to the poor performance of signature schemes such an approach is not practical. Some multicast applications require a packet rate exceeding 50 packets/s. Most applications which require less throughput, nevertheless cannot devote a significant fraction of the sender's computing resources to calculating signatures. Also, if a sender is serving multicast data to several multicast groups, the number of public-key signatures that it can perform per second per group is severely limited. Thus this solution is not practically feasible.

Another possible solution is to relax the security requirements for authentication. If a certain amount of risk is acceptable, then one could use a fast but less well-studied signature algorithm, such as those based on Elliptic Curves. This approach would provide fast yet secure authentication only to the degree to which the underlying cryptographic assumptions are valid. However, when these assumptions turn out to be invalid, these schemes may be completely open to compromise.

Another approach to packet authentication when the security requirement is relaxed is to use so-called "asymmetric MACs". The basic idea is that one can use a scheme in which multiple Message Authentication Codes (MACs) are appended to each packet. This has the property that the packet can be authenticated by each receiver. It requires at least a threshold of malicious receivers to collude in order to masquerade as a sender. However, the number of MAC's computed by the sender and attached to the packet needs to be a linear function of the number of colluders that the scheme is supposed to be resilient against. Therefore, even though this scheme may be useful in some scenarios, e.g., when groups are small and problems of collusion can be controlled, it does not work well in scenarios where the multicast group is very large and large collusions are likely to occur or difficult to detect.

When reliability of transmission is not an issue, an approach known as stream signing may be useful. It is used to sign the multicast packets and yet provide strong security guarantees of authentication and nonrepudiation associated with digital signatures. In this approach only one regular signature is transmitted at the beginning of a stream of packets. Each packet either contains a cryptographic hash of the next packet in the stream, or a 1-time public key using which the next packet can be verified. However, this approach cannot tolerate a lost packet, since the information needed to authenticate future packets is lost.

Given that IP-Multicast is generally an unreliable protocol and/or many mulitcast applications such as audio and video delivery are unlikely to require reliability this solution may not be applicable. Also, even if reliability is not an issue this solution requires use of 1-time keys and signatures to be embedded in each data packet. Such keys and signatures are fairly large and can result in a substantial space overhead within each packet which may be unacceptably large. Sometimes, the stream signing overhead can be substantially reduced at the cost of introducing a delay at the sender side and grouping several packets together so as to distribute the overhead into multiple packets. However, delaying and grouping of sender's packets cannot be done in peer-to-peer interactive multicast applications such as distributed simulations and gaming which are important multicast usage scenarios.

Another approach is useful when a sender is allowed to delay and group together several consecutive packets. In this approach, the sender uses a collision resistant hash function to form an authentication tree from packets collected during a time-interval and signs the root of the authentication tree. Each packet is augmented by the signature on the root and ancillary information. The ancillary information includes hashes of neighboring nodes on the logarithmically long path from the message to the root of the authentication tree. The collected and augmented packets are then sent. This allows each packet to be individually verified at the receiving end.

While this approach is quite effective in client-server scenarios where the server is dedicated to serving a small number of multicast flows, each with reasonably smooth flow rates and strictly enforced bounds on processor loading, it suffer from several practical drawbacks. Firstly, delaying and grouping of sender's packets is not always possible for many important multicast applications. Secondly, there is still a problem of serving multiple multicast flows. This is best illustrated by the following example. Suppose a server only has enough cycles to perform 10 public key operations per second. Using this approach, such a server could potentially serve hundreds of authenticated packets per second to a single flow with only a minor delay, say a tenth of a second. However, if the same server was required to send only 50 different flows, each with a packet rate of only 1 packet/second (such as serving multiple hand held devices) for a total of 50 packets/second throughput, this will not be possible unless the same signing key and authentication tree data structure is shared across different flows, or an unacceptably long delay of 5 seconds is imposed on each flow. Sharing between flows puts unreasonable constraints on the software architecture at the server side. This restrict the choice of authentication mechanisms and expose privacy issues regarding combining information from different flows. A third problem with the scheme is that the size of the authentication information tacked on to each message is not fixed. The size depends of the short-term packet rate which in many applications is likely highly irregular and bursty. During bursty periods, the packets will be larger. This can cause undesirable side-effects such as increased packet loss due to fragmentation. A fourth problem with the scheme is that it provides no mechanism to smooth out bursty processor loads. In any real system there are periods when the processor has enough free time to calculate 50 signatures/s. However, there are also times when the processor barely has time to calculate 1–2 signatures/s. With the tree approach, there is no way to leverage the idle time of the CPU to help during the time when it is highly loaded. Performance will seriously degrade when the CPU gets loaded.

SUMMARY OF THE INVENTION

In one aspect, the present invention addresses the problem caused by the slow speed of public key signature algorithms. It solves the problem of packet authentication for multicast and other scenarios requiring fast, compact digital signatures.

Another aspect of the present invention provides security guarantees required for packet authentication in a way that can handle multiple independent flows, produces authentication fields of fixed size, works in the fully unreliable setting, does not require any packet delays and has the additional property of being able to withstand and smooth over irregular processor loading and bursty packet output rate.

An aspect of the present invention uses a hybrid approach consisting of the signer creating a certificate for the public key of an efficient k-time signature scheme using a regular signature key. The signer then signing up to k messages with the private key corresponding to k-time public key. The time consumed to compute a public key signature is amortized over k signatures.

These and other aspects are provided in a signature scheme wherein a commitment is employed. Other objects and a better understanding of the invention may be realized by referring to the detailed description.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

Figure 1:
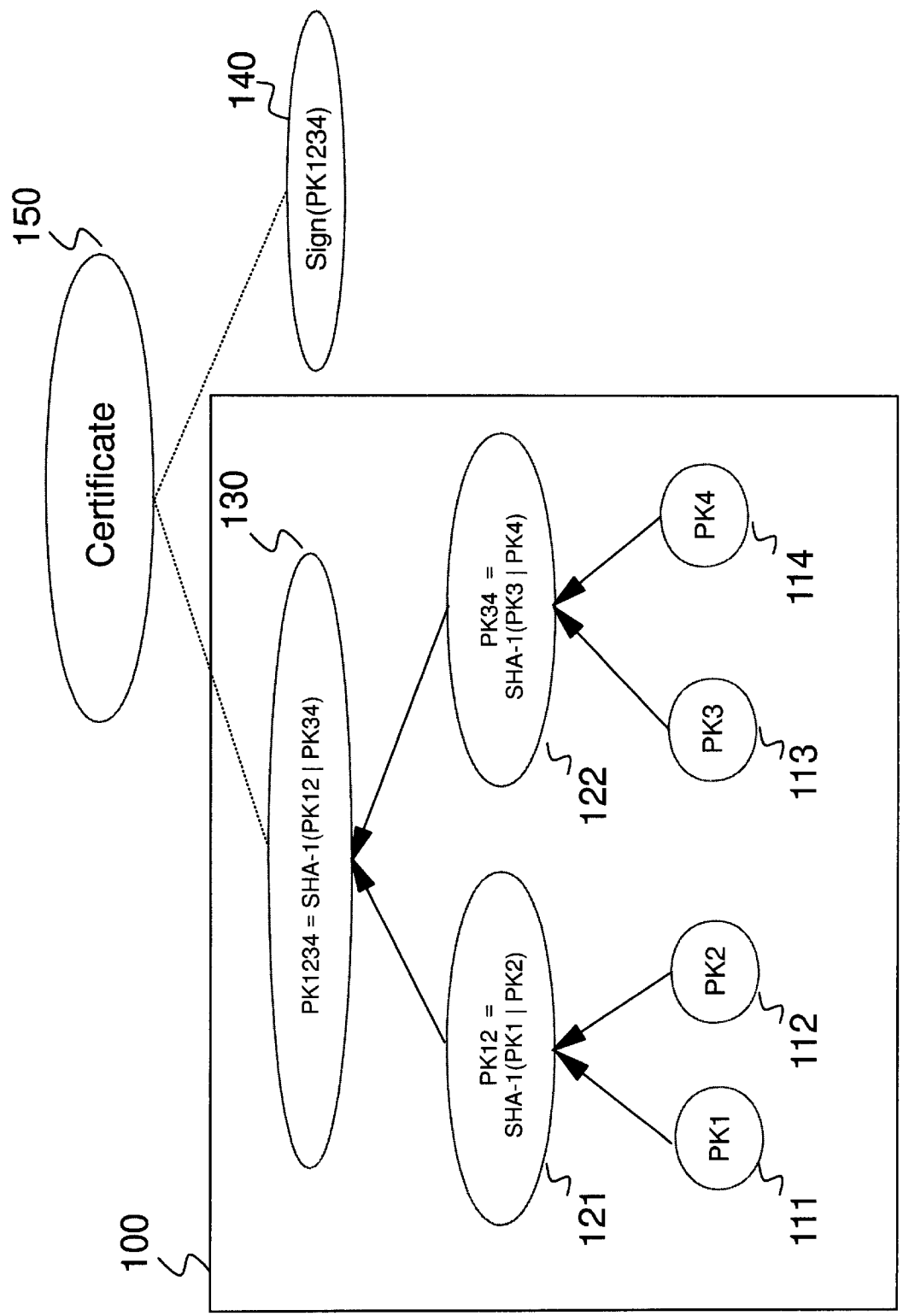
FIG. 1 shows an example of a process for generating a certified 4-time public key from 4 1-time public keys using an authentication tree based on the collision resistant hash function SHA-1.

The present invention provides methods, apparatus and computer articles which solve problems caused by the slow speed of public key signature algorithms without many of the drawbacks of other schemes. Although the following discussion describes ways to solve problems of packet authentication for multicast, it should be obvious to those with ordinary skill in the art that the same concepts and/or approach have applications to many other scenarios requiring fast, compact digital signatures. The methods, apparatus and computer articles are herein said to employ a 'commitment based signature scheme' in accordance with the present invention. In what follows the term message is used to refer to an internal message which contains the information being signed.

The present invention provides security guarantees required for packet authentication. Its performance is generally efficient in speed and size, can handle multiple independent flows, produces authentication fields of fixed size, works in a fully unreliable setting (with additional small overhead), and does not require any packet delays. It has the additional property of being able to withstand and smooth over irregular processor loading and bursty packet output rate. In some ways the invention mimics the public key signature per packet approach which is an ideal solution to this problem when the speed of public key signature algorithms is not an issue.

The present invention adopts a hybrid approach based on the following realization. Although public key signature schemes are slow, a private key can be used an unlimited number of times. There exist well known secure 1-time, or k-time for some constant k, signature schemes in which key generation, signature generation and verification is extremely fast. However, the public-private key pair for such schemes can be used at most once, or k times respectively. Several 1-time/k-time schemes are known to those familiar with the art.

Therefore the use of the hybrid approach in which a signer creates a certificate for the public key of an efficient k-time signature scheme using his regular signature key, and then signs upto k messages with the private key corresponding to the k-time public key results in a very fast hybrid signature scheme. This is because the time consumed to compute a regular public key signature to create the certificate is amortized over k message signatures. This may be viewed as a direct generalization of an off-line/on-line signature scheme in which the off-line expensive computation uses a regular signature on a 1-time public key, and the on-line fast computation uses a 1-time signature.

Using this hybrid approach, packet authentication may be done as follows. Either the sender, or an entity trusted by the sender, runs a background key generation process. This process creates a buffer of k-time public/private key pairs and creates certificates for each of the k-time public keys using a regular signature scheme. In an example embodiment this is done by creating k, 1-time public/private key pairs and combining them to form a a k-time public/private key pair. The k-time public key is determined by computing a hash tree of k 1-time public keys and setting the root of the tree to be the k-time public key. The certificate for the k-time public key is the signature of the sender on the root of the hash tree. This may use the sender's regular signature scheme.

An example of such an approach is illustrated in FIG. 1 for k=4. FIG. 1 shows how a 4-time public key and certificate is built from 4 1-time public keys PK1 (111), PK2 (112), PK3 (113), and PK4 (114), the SHA-1 collision resistant hash function and a regular signature scheme. The first step is to form a authentication tree from the 4 1-time keys PK1, PK2, PK3 and PK4 (111–114) by putting them at leaves of a binary tree (100).

At the next higher level of the binary tree there are 2 nodes PK12 (121) and PK34 (122), where the value of PK12 (121) is derived from PK1 (111) and PK2 (112) by applying the SHA-1 hash function to the concatenation of PK1 and PK2, and the value of PK34 (122) is similarly derived from PK3 (113) and PK4 (114). At the root of this tree is the node PK1234 (130). This node is the 4-time public key which is derived by applying the SHA-1 hash function to the concatenation of the values of the 2 nodes at the lower level in the tree, i.e., PK12 (121) and PK34 (122). The root PK1234 (130) together with a regular signature on the root (140) form the certificate (150) for the 4-time public key PK1234 (130).

An example of an embodiment of the process of computing signatures on messages using this hybrid scheme uses the following steps. Consider a time when the signer is working with a particular k-time key pair and its corresponding certificate. Assume that the signer has already used up (i−1) of the k uses of the k-time key. This is after the signer has already performed (i−1) signatures using (i−1) private keys which constitute a subset of the k-time private key in the generation scheme described above. To sign a given next message m, the signer computes a collision resistant hash h of the next message m, and signs h with the i'th use of the k-time private key to form a signature s. This corresponds to the i'th 1-time key within the k-time key in our example. Now the signer appends signature s with some ancillary information. In this example this is the i'th public key and hashes of all neighbors on the path from the i'th public key to the root of the hash tree formed during the construction of the k-time public key. The purpose of this ancillary information is to permit a verifier to verify from the k-time public key, the i'th use of the corresponding private key. The signature s, the ancillary information and the certificate together provides enough information for a verifier to verify the signature on the message. Since the same certificate is to be used at the verifying end for all k uses of the key, depending on the amount of unreliability, in some embodiments the certificate is not sent for each signed message to the verifier. It is sent as a single separate packet or multiple packets. Alternatively, the certificate is embedded within each signed message packet or into a fraction of the signed message packets. The signature s and ancillary information is sent along with each message in order to verify the signature on the message.

Figure 2:
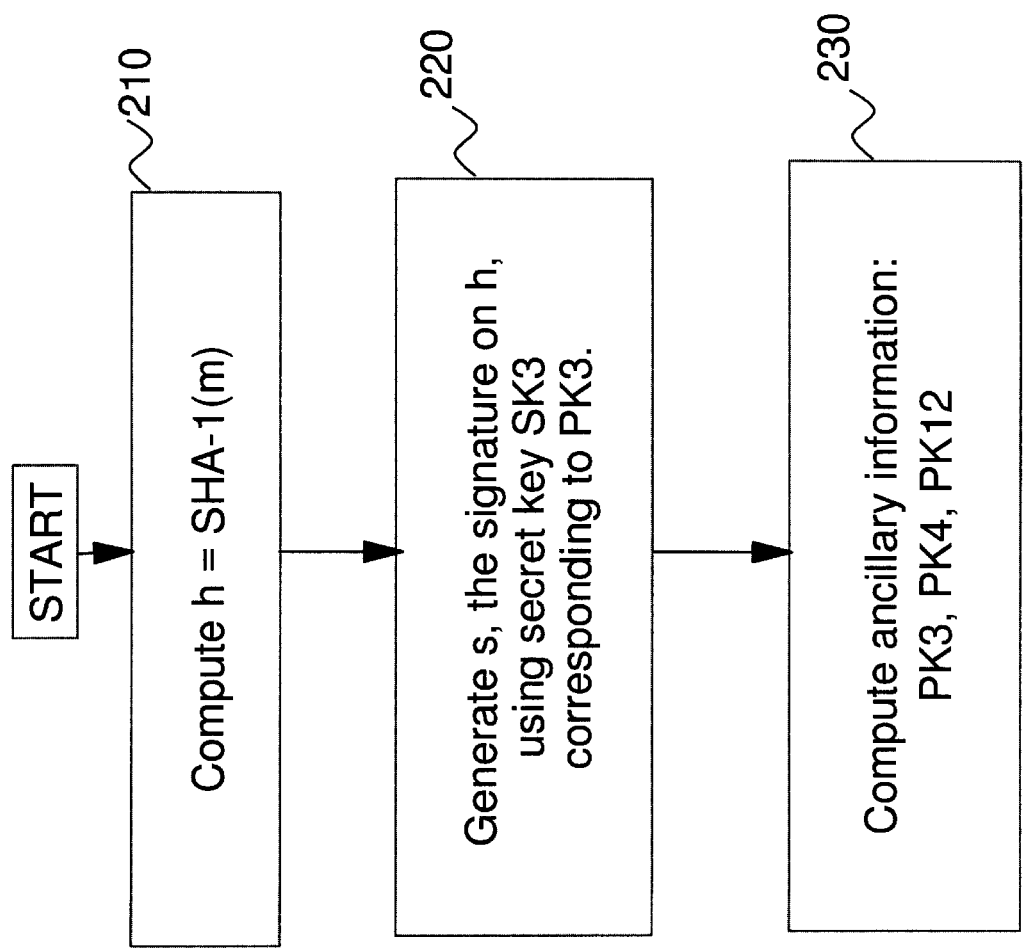
FIG. 2 shows an example of a process of signing a message with the 3rd use of a 4-time key and the process of creating ancillary information.

In this embodiment, once a k-time key is fully used up, i.e., k messages have been signed using the key, the signer proceeds to the next available k-time key and its corresponding certificate from its buffer of other k-time keys and certificates. FIG. 2 illustrates an example of a signing process for a message m based on the 3'rd use of the 4-time key PK1234 (130) derived in FIG. 1, and the SHA-1 collision resistant hash function. To sign m, first h=SHA-1 (m) is computed (210). To sign m in a third use of PK1234 (130), use the secret key, SK3, corresponding to the 1-time public key PK3 (113) to generate a 1-time signature s on h (220). Compute the ancillary information (230). In this case the ancillary information is PK3 (113), PK4 (114) and PK12 (121).

An example of the process of verifying signed messages using this scheme has the following steps. The verifier has access to the certificate for the k-time key being used to sign all messages. It can obtain the certificate in many ways as outlined earlier. The certificate may be a separate packet or embedded within some or all message packets. In one embodiment the certificate receiver/verifier builds a cache of received certificates. After verifying the certificate, the verifier has a verified k-time public key. In this example this is the root of the hash tree formed from k 1-time public keys. Along with each message m, the receiver/verifier also receives a signature, s, and ancillary information corresponding to some i'th use to the k-time key on the message. The receiver computes h, the collision resistant hash of m and verifies the signature s on h, with respect to the i'th public key. It then uses the ancillary information to authenticate the i'th public key with respect to the k-time public key. In this example this is done by verifying that the provided ancillary information is consistent with a hash tree with the i'th public key as a leaf and the k-time public key as a root.

Figure 3:
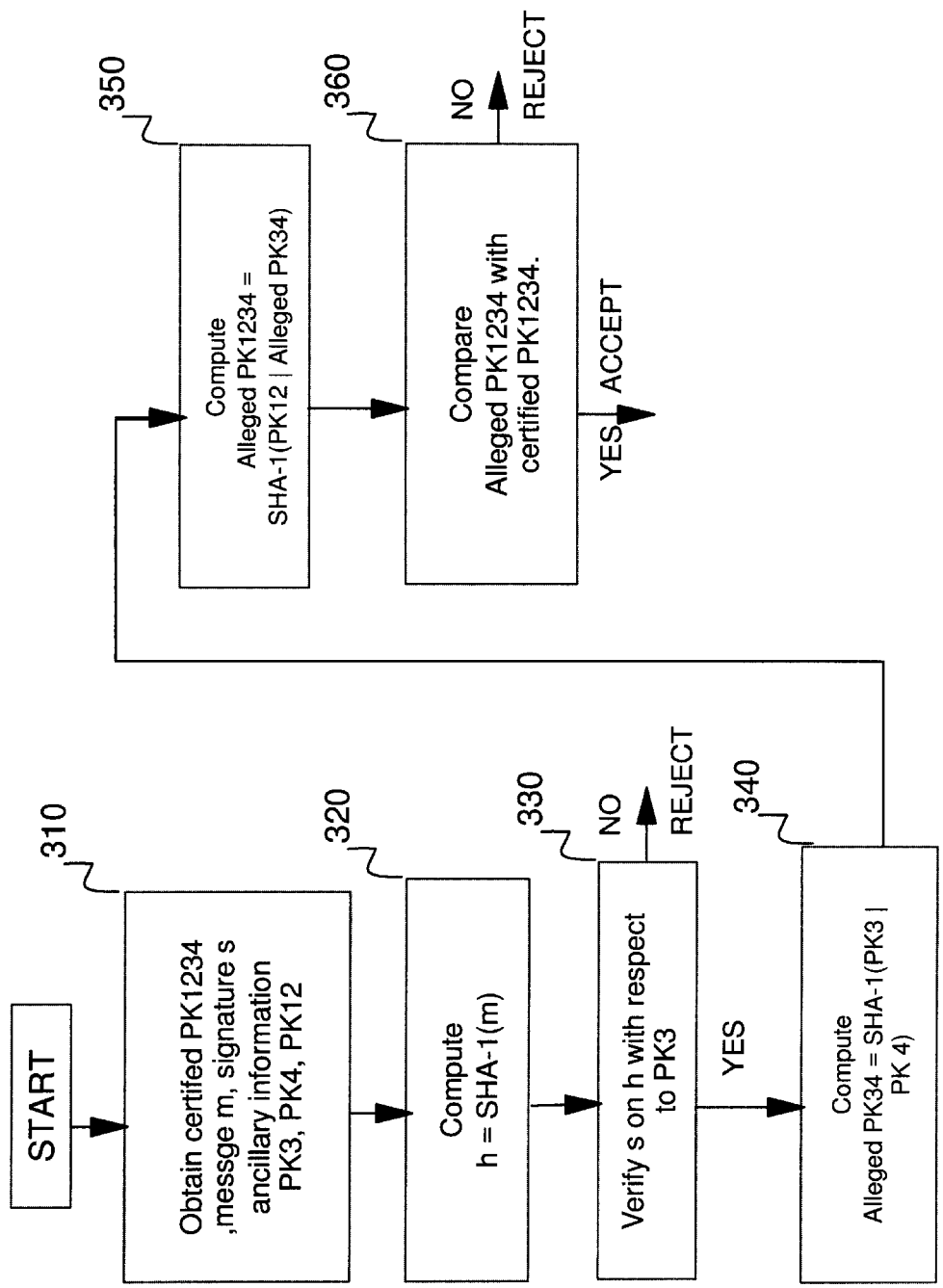
FIG. 3 shows an example of a process of verifying a signed message consisting of 3'rd signature from a 4-time public key and ancillary information.

FIG. 3 shows an example of a process for verifying a signed message m as created in FIG. 2. The signed message is assumed to consist of the message m, the signature s and ancillary information PK3, PK4 and PK12 (310). The SHA-1 hash h of the message m is created (320). The supplied signature s on h is verified against the alleged public key PK3 (330). If verification produces a match, then the signature is valid provided that the supplied public PK3 is the same as that used in the derivation of the authentication tree in FIG. 1. The validity of the supplied PK3 is checked as follows. First the supplied values of PK3 and PK4 are hashed using SHA-1 to derive the alleged value of the interior node PK34 within the authentication tree shown in FIG. 1 (340). The value of the supplied node PK12 and the computed value of PK34 are hashed using SHA-1 to derive the alleged value of the root node PK1234 of the hash tree (350). This derived value is compared against the signed value of PK1234 in the verified certificate for PK1234 (130) and if it matches then the signature on m is valid, otherwise it is invalid (360).

This method solves the problem related to signing speed. This is because the cost of a single expensive public-key signature is amortized over k packets. The per-packet cost associated with 1-time/k-time signature is fairly inexpensive. This method also handles multiple flows, bursty traffic and bursty processor load very well. This is because the buffers of certified k-time keys can be precomputed and filled up during periods of low CPU usage and slow traffic, to tide over periods of high CPU usage and high traffic.

However, this approach suffers from a drawback which may make it impractical for many uses. This drawback is the size overhead of state-of-the-art one-time/k-time signature schemes, together with the overhead of the ancillary information. One-time/k-time schemes have either very large signatures or public keys or both. This overhead can easily amount to half a kilobyte per packet or more. This is unacceptable for many applications. For example, many UDP/IP-Multicast applications limit the packet size to a few hundred bytes to prevent additional packet loss due to fragmentation. Although 1-time/k-time schemes generally have some tradeoff between size and speed the tradeoff is overwhelmingly biased towards speed, such that a small reduction in size normally results in a very large decrease in speed.

Other size overheads in the scheme described include the size of the certificate for the k-time public key and the size of the ancillary information attached to each signature.

An improvement to the method of the present invention makes it possible to dramatically cut down on the size overhead associated with the signature scheme. Whereas, the motivation for these ideas is to cut down the size of signatures and ancillary information, this size reduction results in comparable speed improvements on the underlying 1-time/k-time signature schemes as well. In embodiments in which size of signatures is not an issue, and given the heavy bias in the speed/size tradeoff for 1-time/k-time schemes, these techniques can also be used to create disproportionately much faster 1-time/k-time signature schemes with signature sizes similar to schemes which do not use these techniques. For example, those skilled in the art will recognize that one could start with a larger sized signature scheme which is much faster and then use the size reduction techniques described here to cut down the size of the signatures back to a more useable size. This is done while retaining or even improving upon the speed.

Many 1-time/k-time signature scheme have a signature size and speed which is proportional to the number of bits of the message being signed. Typically, to deal with arbitrary sized messages, the actual value that is signed is a collision resistant hash of the message. However, the signing operation can also be performed using TCR hash functions instead of collision resistant hash functions. An advantage with TCR hash functions is that their output size need not be as large as the output of a collision resistant hash function. This is because several types of attacks based on the size of the output are not applicable to TCR functions. In practice this means that the output size of a TCR hash function can be only one half as large as a comparable collision resistant function. This may not provide significant size advantage for 1-time/k-time signature schemes. This is due to security reasons which may require a signature on both the output of the TCR function and the randomly chosen TCR key. This key is part of the TCR function calculation after the message to be signed has been fixed. A further size reduction results by using a scheme in which this TCR key does not have to be signed using the one-time/k-time signature scheme. To retain security, the TCR key should satisfy two properties. The TCR key should be signed somehow by the signer and this key should not be disclosed before the message is fixed, otherwise, an adversary that knows the key beforehand can influence the message in a way that can break the signature scheme.

A further improvement to the present invention is provided based on the following consideration. For any signature scheme, at the time of generating a public-private key pair one can generate other digital strings which are herein referred to as enhancing keys, include regular-commitments to the enhancing keys as part of the public key and retain the enhancing keys as part of the private key. When creating the certificate of the public-key, the certificate signer directly or indirectly be signs the regular-commitments to all these enhancing keys. At the time of performing a signature with the private key, the signer uses one or more of the enhancing keys to realize additional efficiencies in the signature process and may open the commitments to the some/all enhancing keys used in the process.

An example embodiment of the present invention using these regular commitments performs the following steps in a commitment based signature scheme. During the generation of each k-time public-private key pair, the signer chooses at random all the k TCR hash keys which are later used in the TCR hash calculation on the k messages that are signed by the k-time key being generated. These are the enhancing keys for this embodiment. The signer includes regular-committments to these keys as part of the k-time public key. Thus, when creating the certificate for the k-time public-key the signer directly or indirectly signs the regular-commitments to all these enhancing keys. Anyone who obtains this certificate or the k-time public key inside therefore gets no knowledge of the TCR-keys. This is so even though by signing the commitment to the enhancing keys the signer has in effect signed on to ownership of these keys. Now when the signer is asked to sign an i'th message with the k-time public key, the signer creates a signature that includes an i'th instance of a k-time signature on only the TCR hash of the message computed using the i-th enhancing key and a commitment opening string to the i-th enhancing key. The signature verifier is given the message and an i'th instance of a k-time signature together with the opening string to the regular-commitment to the TCR hash key. The verifier derives the TCR hash key from the opening string and uses it to compute the TCR hash of the message, verifies the i'th instance of the k-time signature on this hash and also verifies that the commitment opening string is consistent with the signed regular-commitment made in the certificate for the k-time public key.

In effect the i-th TCR key, which is the i'th enhancing key becomes publicly known only after the i-th message has been fixed and signed. For everyone else other than the signer the process is the same as if the signer had actually chosen the TCR key at random after the message was fixed. Thus the security or the semantics of the signature scheme are not compromised. Moreover, the size overhead of the commitment opening string is small when compared to the size savings in applying a typical 1-time/k-time signature only on the TCR hash of the message. The TCR hash is usually only half as large as the collision resistant hash of the message which in itself yields a factor of 2 reduction in size of the signature. Another benefit of this size reduction is a factor of 2 improvement of the speed of the generation, signature and verification times 1-time/k-time signature scheme.

Many k-time signature schemes are constructed from k independent 1-time schemes, as was done in our example. When such a k-time scheme is employed in conjunction with the other concepts of the present invention, another optimization results. This generally reduces the size of the public key of the resulting k-time scheme, the size of the certificate and the size of ancillary information that is added along with each 1-time signature which authenticates the particular i'th use of the k-time scheme. This is done as follows. Following the previous example and using the new 1-time public key scheme with commitments, a k-time public key is formed by computing a target collision resistant hash function rather than the using a collision resistant hash function based on the authentication tree of k 1-time public keys as in FIG. 1. As an optimization, the tree is formed based on the TCR hash of these k public keys. This tree is herein referred to as a TCR tree. The TCR hash, together with the keys used to compute the TCR tree based TCR hash becomes the k-time public key.

This approach offers a big advantage in that verifying that a node belongs to a leaf in a TCR tree, requires much less ancillary information than the case of a authentication tree based on a collision resistant hash function for the same number of leaves. However, use of a TCR function in creating a k-time public key weakens the regular-commitment scheme embedded in the 1-time public key. The commitment when used with a TCR tree is herein referred to as being a "TCR-commitment". A a "TCR-commitment" produces an enhanced 'commitment based signature scheme.' A TCR commitment is a type of commitment in which it is possible for a committer to later alter the committed value but has no incentive to do so. However, the receiver of the TCR commitment gets no information from the TCR-commitment, and also cannot create a different consistent opening of the TCR-commitment once the committer has opened the TCR-commitment. This weakening therefore has little or no impact on the security of the signature scheme but results in a generally significant performance improvement.

The k-time public key is signed using a regular signature to form the certificate. Another optimization that is employed in some embodiments of the present invention is the use of a padding scheme known to those skilled in the art. This scheme embeds the k-time public key inside the regular signature itself for many popular public key signature schemes and thus saves on the overhead of transmitting both the k-time public key and a regular signature on it.

An example embodiment of the present invention is based on a specific 36-time signature scheme and 1024-bit RSA as the base signature algorithm. These presently provide what is considered to be adequate levels of security given the state of current knowledge and technology. The embodiment provides a level of security of the order of $2^{\wedge}(80)$ operations which is considered adequate. By adjusting the input-output sizes of the primitives described below, the scheme generalizes to provide higher and/or lower levels of security as required by a particular application.

The scheme is based on cryptographic primitives, each of which offers around 80 bits of security. Such primitives can be specifically designed or derived from other known primitives. In what follows the primitive is described in terms of its cryptographic properties. A specific instance of that primitive is provided for the example embodiment.

Let H denote a collision resistant hash function with 160 bit output. In addition we require that the output of H on large, high entropy inputs (entropy>200 bytes) should not provide any statistically significant information on the initial 80-bit prefix of the input. This property is very likely to hold for practical collision resistant hash functions with no known statistical weakness such as SHA-1. In this example embodiment H is chosen to be SHA-1 hash algorithm although any collision resistant hash function may be used. In this embodiment H is used both as a collision resistant hash function and as the basis for a commitment scheme.

Let $G(K, x)$ denote a family of keyed one-way functions with an 80 bit key K, an 80 bit input x, and producing a 80 bit output. In practice $G(K,x)$ is derived from the SHA-1 compress function as follows: The SHA-1 compress function SHA-1Compress(IV,D) takes a 160 bit parameter IV and a 512 bit parameter D to produce a 160 bit output. Define Pad80to160(K) to be a function from 80-bits to 160 bits. This function makes two copies of its input parameter to make a 160 bit string, and computes the exclusive OR of the resulting bit string with the 160-bit hexadecimal value 67452301efcdab8998badcfe103255476c3d2e1f0. Define Pad80to512(x) to be a function from 80 bits to 512 bits which pads the 80 bit input to 512 bits by adding trailing 0 bits. Then the example embodiment of $G(K,x)$ is the first 80 bits of output of SHA-1Compress(Pad80to160(K), Pad80to512(x)).

Let $T1(K,x)$ denote a target collision resistant keyed hash function family taking an 80 bit key K and a 480 bit input x, producing an 80 bit output. The example embodiment for T1 is as follows: Define Pad480to512(x) to be a function which pads a 480 bit input to 512 bit by adding trailing 0 bits. The preferred embodiment of $T(K,x)$ is the first 80-bits of output of SHA-1Compress(Pad80to160(K), Pad480to512(x)).

Let $T2(K,x)$ denote a target collision resistant keyed hash function family taking an 80 bit key K, a 160 bit input x, and producing a 80 bit output. Let Pad160to512(x) be defined to be a 160-bit to 512 bit function which pads its input to 512 bits by adding trailing 0's. In the example embodiment, T2(K,x) is the first 80 bits of output of SHA-1Compress (Pad80to160(K), Pad160to512(x)).

An example generation of the 36-time key is as follows. It is essentially derived from 36 independent random 1-time public keys hashed down using TCR hash functions in a tree construction known to those skilled in the art. The 36-time private keys are some of the intermediate values used in the construction.

Figure 4:
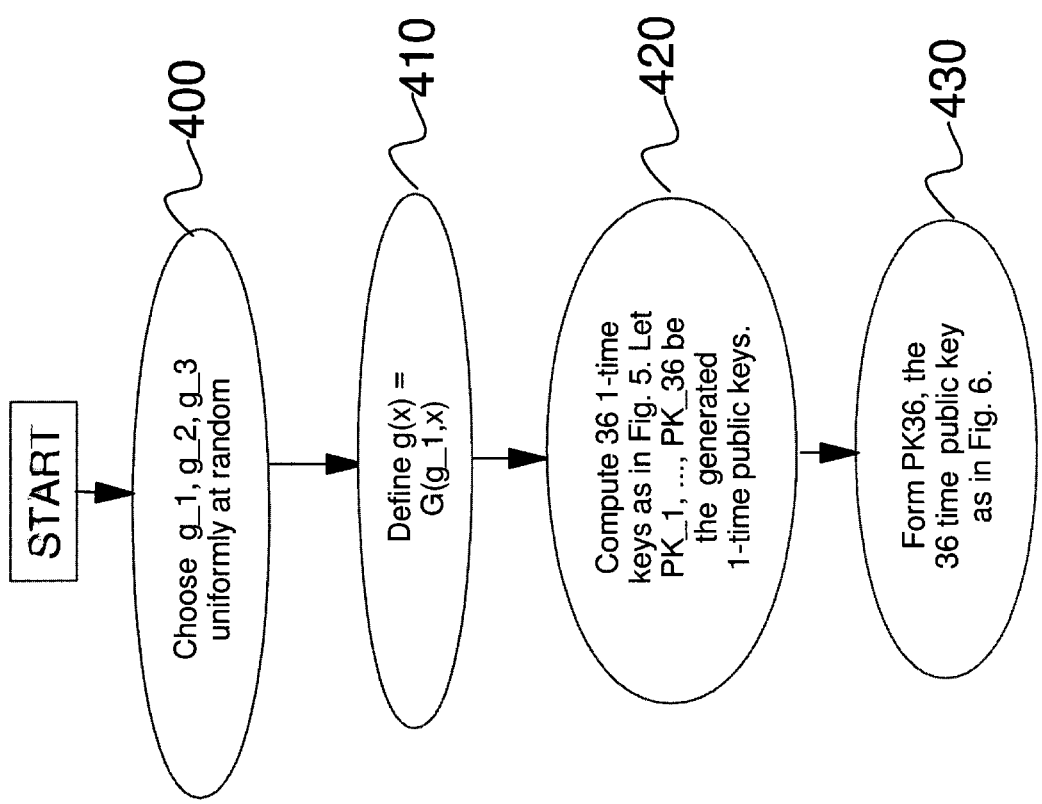
FIG. 4 shows a high level description of an example generation process of a 36-time key pair embodiment.

The example 36-time key generation outlined in FIG. 4, is done as follows: Pick three 80-bit keys g__1, g__2 and g__3 uniformly at random (400). These keys are used throughout the construction of this 36-use public key. Throughout the construction, g(x)=G(g__1, x) is used as an 80 bit to 80 bit one-way function (410). Now for each i, (1 to 36) compute the i'th key pair (420).

Figure 5:
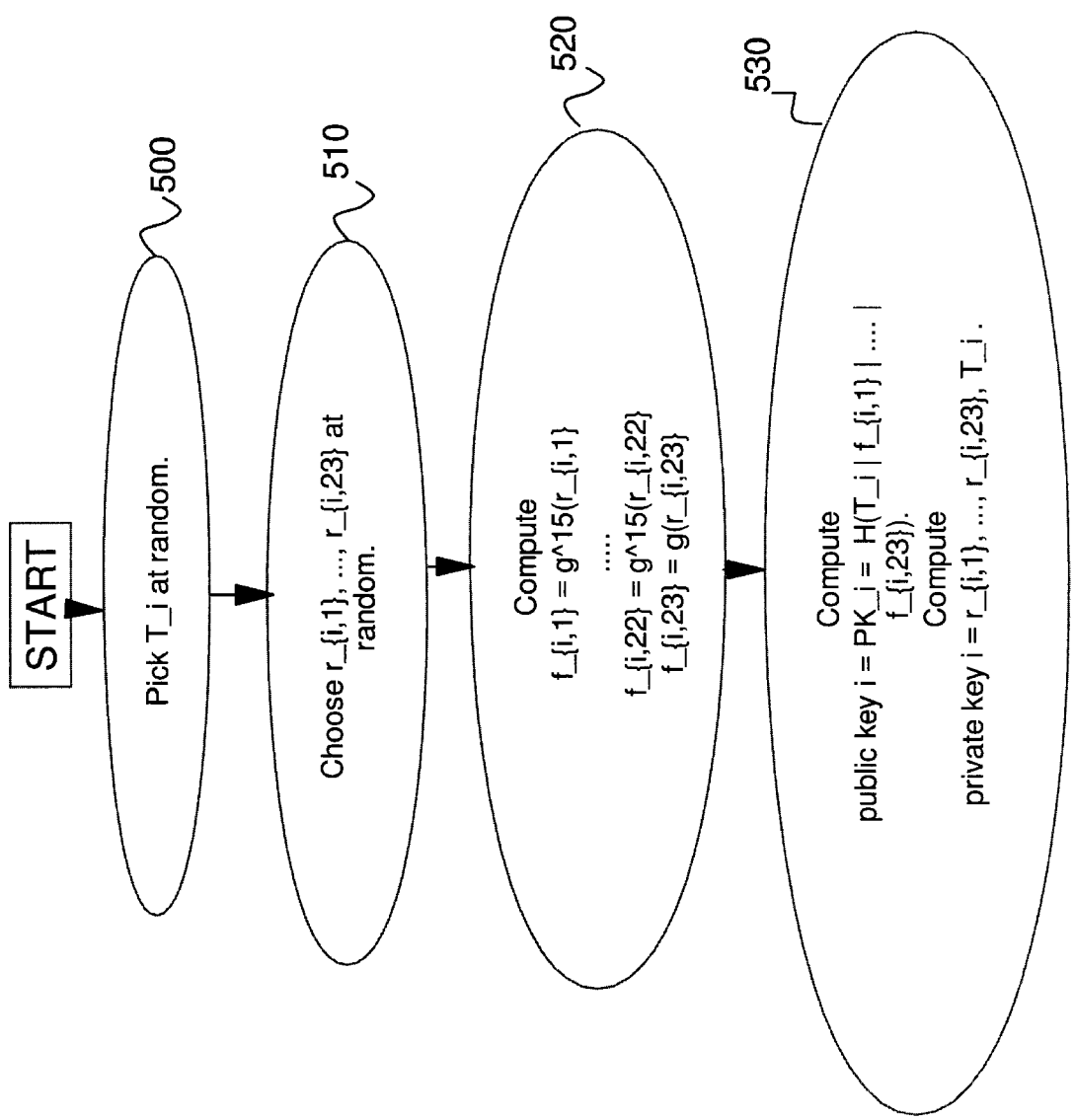
FIG. 5 shows the construction of the i'th one-time signature key-pair with embedded enhancing key commitment, as part of the construction of the 36-time key pair in the preferred embodiment.

The details of computing the i'th key pair are given in FIG. 5 and consists of the following steps. Pick T__i, an 80 bit key uniformly at random (500). T__i is used as the key to the TCR function when the i'th key is used to sign a message. T__i's therefore are the enhancing keys in the invention. Pick 23 random 80 bit values, r__{i,1}, . . . , r__{i,23} (510). From these compute f__{i,1}, . . . , f__{i,23} as follows:

For each j=1, . . . ,22, compute
f__{i,j}=g^{15}(r__{i,j}), and
f__{i,23}=g(r__{i,23} (520)

The i'th public key which includes in it a "commitment" for the TCR key T__i used for signing the i'th message is defined as, PK__i=H(T__i | f__{i,1} | . . . . | f__{i,23}), where "|" denotes concatenation (530). In this construction the application of H results in a commitment to T__i.

The public keys for each use of the 36-time signature scheme are PK__1, PK__2, . . . PK__36. These are combined (refer back to FIG. 4) to form PK36 the 36-time public key (430) with details given below and in the description of FIG. 5.

Figure 6:
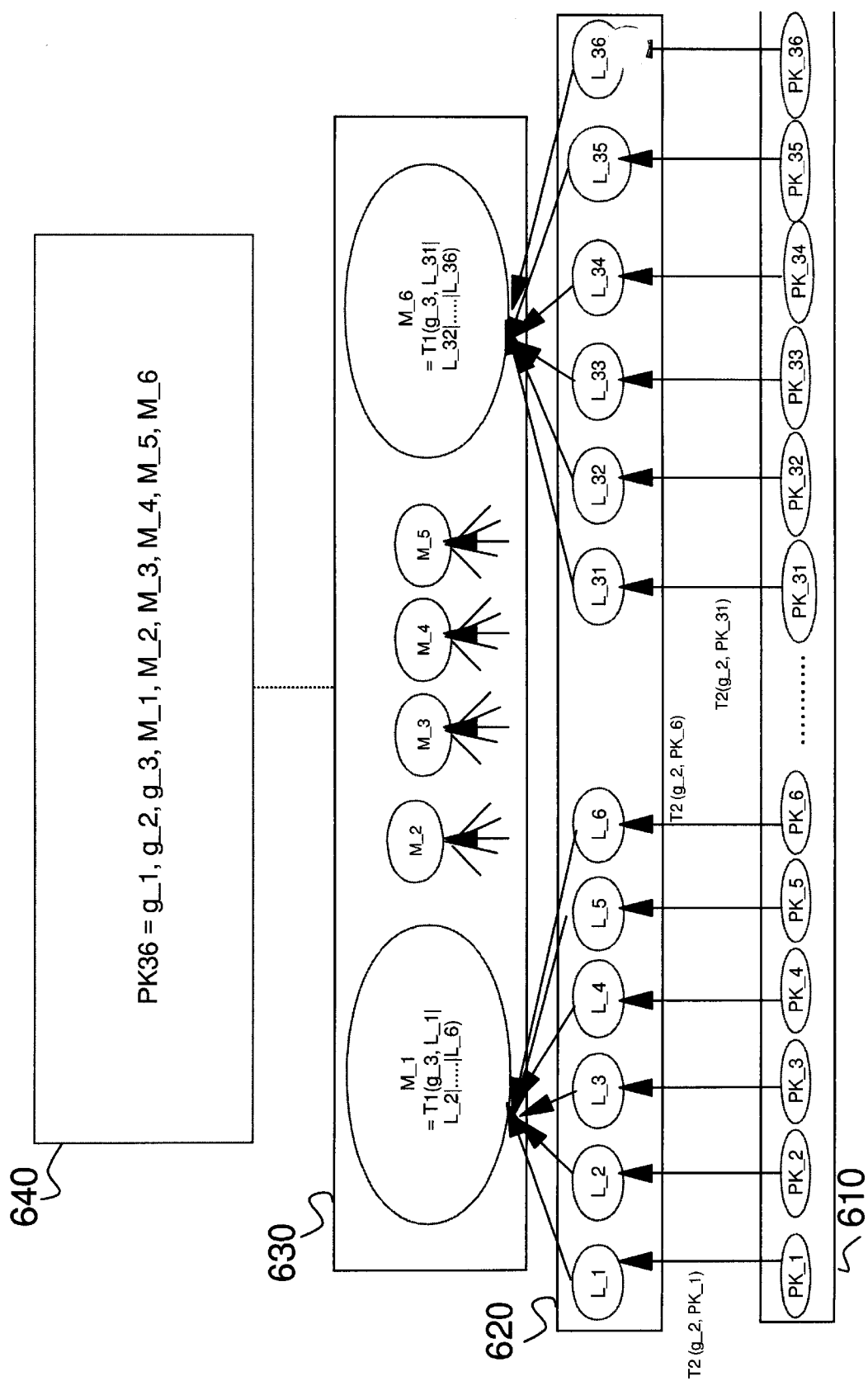
FIG. 6 shows the construction of the 36-time public key from the 36 1-time public keys with embedded commitments, using a TCR hash tree construction.

The public key of the 36-time signature scheme is a tree based TCR hash of the 36 public one-time signature keys PK__1, . . . ,PK__36, together with the keys used to create the TCR hash. This public key is created as follows as is illustrated in FIG. 6. Consider a tree in which the leaves are the 36 public keys PK__1, . . . ,PK__36 each of which is 160 bits long (610). The next higher level in the tree has 36 nodes, L__1, . . . ,L__36, one for each public key. The value of node L__i is just T2(g__2, PK__i), which is the TCR hash of PK__i, using the family T2 under key g__2 (620). The next higher level in the tree has 6 nodes M__1, . . . ,M__6. Thus, each node M__i has 6 children, $L__(6(i−1)+1), . . . ,L__(6i) and its value is computed as M__i=T1(g__3, L__(6(i−1)+1 | . . . | L__(6i)) (630). These 6 nodes M__1, . . . ,M__6 together with g__1, g__2, g__3, constitute the 36-time public key PK36 (640). Since each M__i is an 80-bit value, therefore the 36-time signature scheme has a public key of size 720 bits. Also by applying a Ttree-based TCR hash indirectly on the commitments (T__i's) made within individual 1-time public keys, the individual commitments are transformed into a TCR-commitment on all the T__i's.

Now Consider Certificate Generation for the 36-time Key PK. The certificate for the 720-bit, 36-time key public key PK36 is created by applying the 1024-bit RSA signature algorithm with PK36 as embedded data as known to those familiar with the art. This results in a 1024 bit value which not only serves as a signature on PK36, but also enables the process of verification of the 1024 bit certificate produces PK36. Thus PK36 never needs to be sent explicitly with the certificate. Thus the certificate is of size 1024 bits or 128 bytes.

Figure 7:
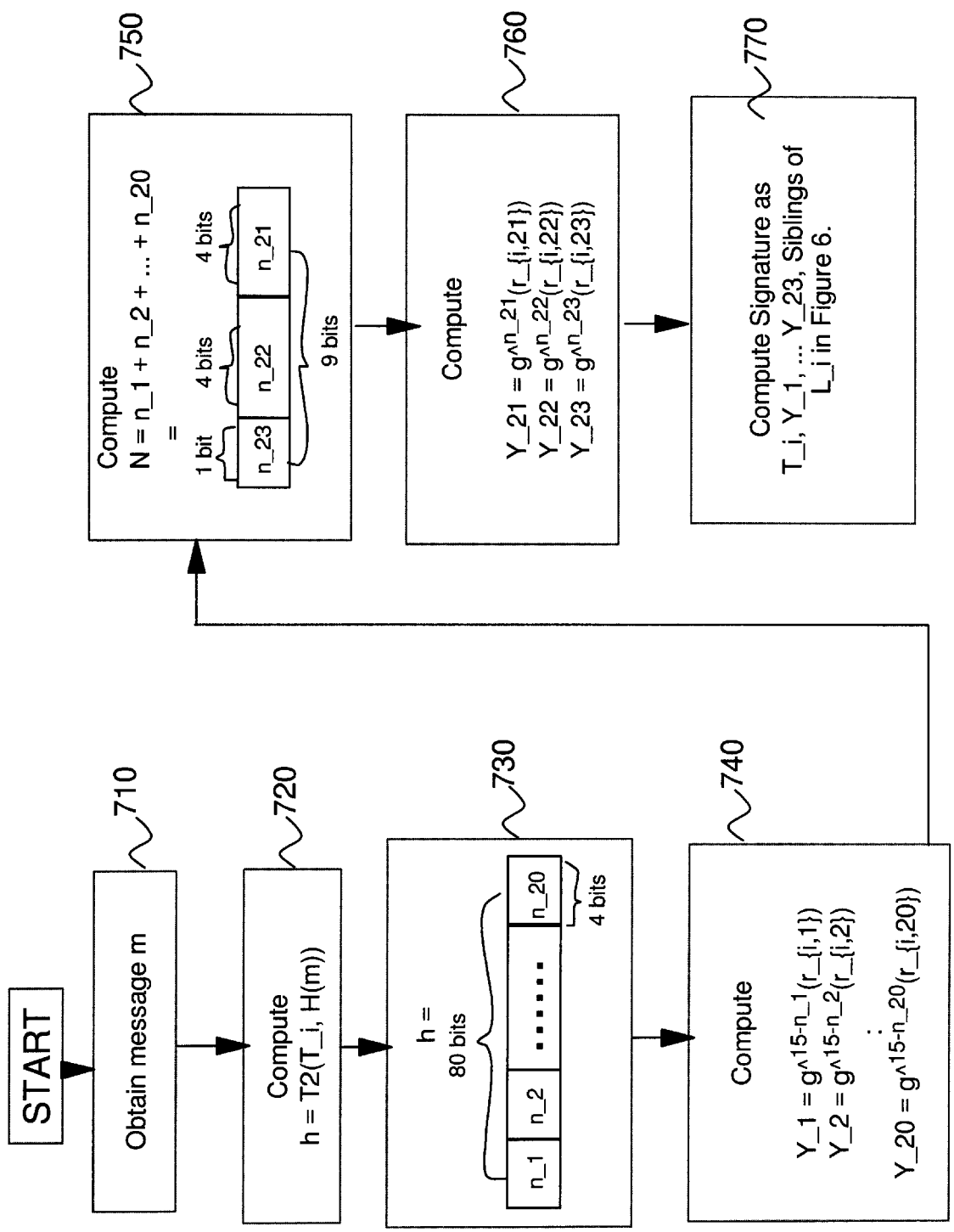
FIG. 7 shows the signature generation process on a message using the i'th key in the 36-time signature scheme in the preferred embodiment.

Now consider generation of the signature for the example embodiment shown in FIG. 7. To sign a message m (710) with the i'th key of the 36-time signature scheme, the signer does the following:

Compute h=T2(T__i, H(m)). This is an 80 bit TCR hash of m (720).

Let h__1, . . . ,h__80 denote the bits of h. Group these bits into 20 groups of 4 consecutive bits (aka nibbles). The value of each nibble is a number from 0 to 15. Let n__1, . . . ,n__20 denote these numbers (730).

For 1<=j<=20, compute:
Y__j=g^{15−n__j}(r__{i,j}) (740), where r__{i,j} are the random numbers chosen during key generation.

Compute N=n__1+n__2+ . . . +n__20, where N is a number between 0 and 300, and therefore fits in 9 bits. Let n__21 denote the value of the least significant 4 bits of N, n__22 denote the value of the next 4 significant bits of N and n__23 denote the value of the most significant 9'th bit of N (750).

Form Y__21=g^{n__21}(r__{i,21}),
form Y__22=g^{n__22}(r__{i,22}), and
form Y__23=g^{n__23}(r__{i,23}). (760)

The signature then includes T__i, Y__1, . . . ,Y__23 together with the values of the 5 other L nodes corresponding to the children of M__{(i+5)/6}, excluding L__i, which are the siblings of L__i, in the key generation process. Let Sib(L__i) denote these sibling nodes. Therefore the signature includes T__i, Y__1, . . . ,Y__23,Sib(L__i). Note that T__i represents the opening of the commitment to the enhancing key made in the i'th public key within PK36 (470). The total signature size is 290 bytes in this example embodiment.

Figure 8:
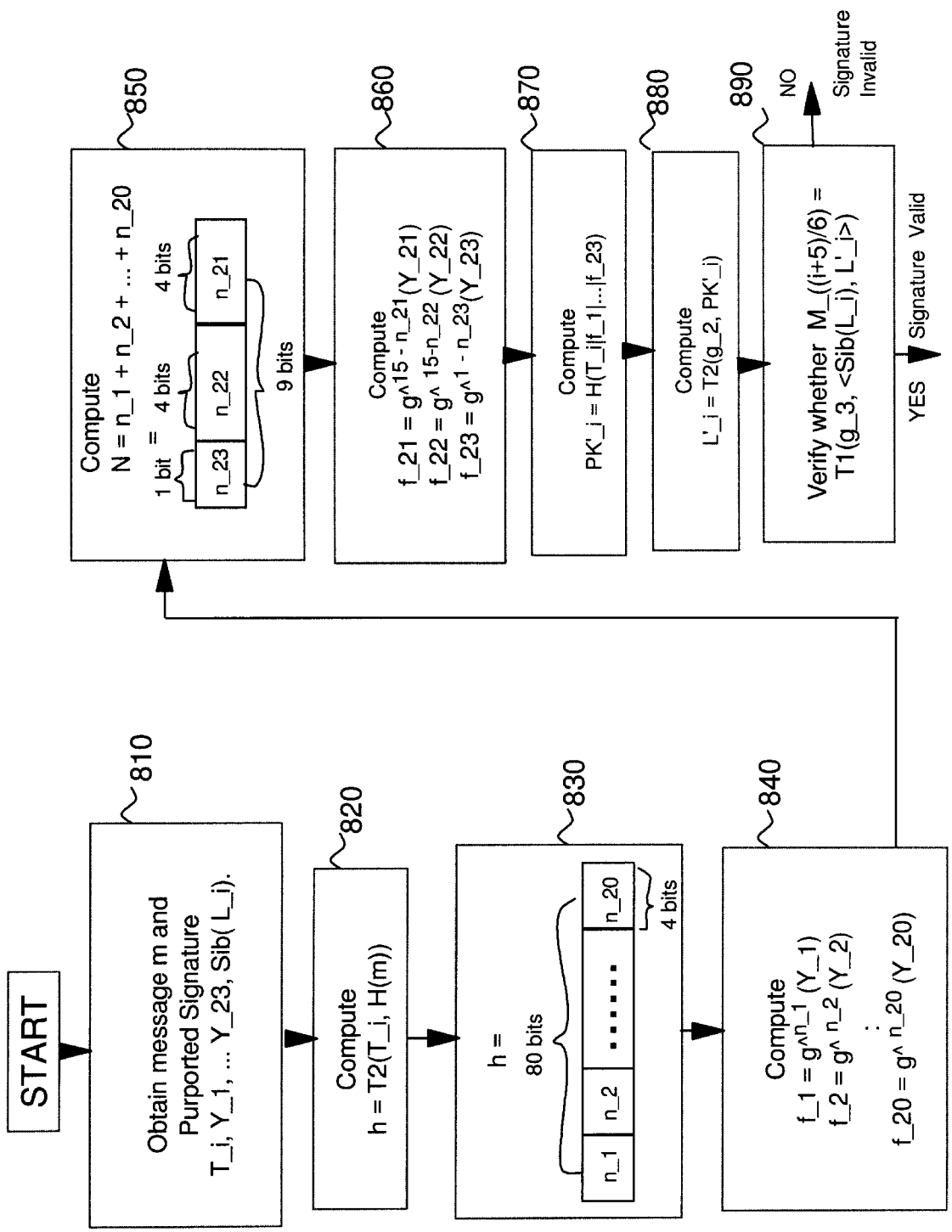
FIG. 8 shows the process of verification of the i'th signed message in the 36-time signature scheme in the preferred embodiment.

Now consider a process for verification of the signature shown in FIG. 8. It is desired to verify a purported signature S__i=T__i,Y__1, . . . ,Y__23,Sib(L__i)

on a message m (810).

Compute h=T2(T__i, H(m)) (820).

Let h__1, . . . ,h__80 denote the bits of h. Group these bits into 20 groups of 4 consecutive bits. Each group is a number from 0 to 15. Let n__1, . . . ,n__20 denote these numbers (830).

For 1<=j<=20, compute f__j=g^{n__j}(Y__i) (840).

Compute N=n__1+n__2+ . . . +n__20, where N is a number between 0 and 300 and therefore fits in 9 bits. Let n__21 denote the value of the least significant 4 bits of N, n__22 denote the value of the next 4 significant bits of N and n__23 denote the value of the most significant 9'th bit of N (850).

Form f__21=g^{15−n__21}(Y__21),
form f__22=g^{15−n__22}(Y__22), and
form f__23=g^{1−n__23}(Y__23) (860).

Compute PK'__i=H(T__i | f__1 | . . . | f__23) (870).

If the signature is correct and the commitment opening string is valid then PK'__i must be the same as PK__i of the key generation phase. To check this compute L'__i=T2(g__2, PK'__i) (880).

If the signature is correct then L'__i must be the same as L__i in the key generation phase. To verify this, since all the siblings of L__i are provided as part of the signature, verify that M__{(i+5)/6}=T1(g__3, <Sib(L__i), L'__i>) where <Sib (L__i),L'__i> is just the concatenation of the L__i's in the proper order (890).

Those with skill in the art will recognize that many variations can be build using the approach followed in this example embodiment. The core one-time signature scheme used in this example embodiment will hereafter be referred to as the 80-bit f(4)-scheme, where 80-bit refers to the level of security and output sizes of the underlying cryptographic primitives and f(4)-scheme refers to the application of the one-way function on 4-bit chunks. The example TCR tree construction over 36 instances of the 80-bit f(4)-scheme is herein referred to as a 80-bit 36-fanout TCR tree, where 80-bit refers to the size of outputs of intermediate TCR function primitives and the security of the scheme and 36-fanout refers to the number of 1-time public keys that the TCR tree hashes to create a k-time key. The composite scheme is termed a 80-bit 36-fanout f(4)-scheme. From the example description, those skilled in the art can easily create p-bit q-fanout f(r)-schemes for several other values of p, q, and r as the technology and application demands. Increasing/decreasing the value of p will generally result in increasing/decreasing the security of the scheme, with a side-effect on the size of the keys and signatures and the signing speeds. Increasing/decreasing the value of q and r will generally create different size/speed tradeoffs while generally maintaining the same level of security. It is noted that the foregoing has outlined some of the more pertinent aspects, objects and embodiments of the present invention. This invention may be used for many applications. Thus, although the description is made for particular arrangements and methods, the intent and concept of the invention is suitable and applicable to other arrangements and applications. Thus, it will be clear to those skilled in the art that other modifications to the disclosed embodiments can be effected without departing from the spirit and scope of the invention. For example, in some cases the TCR-commitment is a regular-commitment. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for generating a signature for a message, the method comprising:

employing a public/private key pair in which the private key includes at least one enhancing key and the public key includes a TCR commitment to said at least one enhancing key;

obtaining an opening string, opening the TCR-commitment to said enhancing key with the opening string, forming a function of the message and the private key, and forming a signature comprising the function and the opening string.

2. A method as recited in claim 1, wherein the opening string includes the enhancing key.

3. A method as recited in claim 1, further comprising combining the signature with the message to form a signed message.

4. A method as recited in claim 3, wherein the step of combining comprises including the message in the signature.

5. A method as recited in claim 1, wherein the signed message includes a certificate.

6. A method comprising:

receiving a signed message having an internal message, a signature, and a commitment opening string, and authenticating the internal message employing a public key from a public/private key pair in which the public key includes a TCR-commitment to an enhancing key and the private key includes at least one enhancing key.

7. A method as recited in claim 6, further including the step of extracting the internal message from the signed message.

8. A method as recited in claim 7, which further includes the step of extracting the opening string from the signed message and verifying the validity of the opening string with respect of the TCR-commitment made to an enhancing string in the public key.

9. A method as recited in claim 8, further comprising verifying validity of the opening string with respect to the TCR-commitment by a computing function using a certificate for the public key.

10. A method as recited in claim 6, further comprising the step of extracting the signature from the signed message.

11. A method as recited in claim 1, wherein the TCR-commitment is a regular-commitment.

12. A method as recited in claim 1 further comprising employing the signature in a commitment based signature scheme.

13. A method as recited in claim 12, wherein the step of employing the commitment based signature scheme is implemented for a 36-time key pair embodiment.

14. A method as recited in claim 12, wherein the step of employing includes using cryptographic primitives having more than 80 bit security.

15. A method as recited in claim 12, wherein the step of employing includes using a SHA-1 hash algorithm.

16. A method as recited in claim 12, further comprising the step of verifying a purported signature.

17. A method for generating a signature for an internal message, the method comprising:

employing a private key which includes at least one enhancing key and which is paired with a public key which includes a commitment to said enhancing key;

opening the commitment to said enhancing key and obtaining an opening string, forming a function of the internal message and the private key, and forming the signature comprising the function and the opening string.

18. A method as recited in claim 17, wherein the opening string includes the enhancing key.

19. A method as recited in claim 16, further comprising combining the signature with the internal message to form a signed message.

20. A method as recited in claim 19, wherein the signed message includes a certificate.

21. A method for a signer to generate key pairs for a signature scheme, the method comprising:

generating k 1-time key pairs;

constructing an authentication tree based on a collision resistant hash function using the k, 1-time public keys of the key pairs thus generated to form a k-time public key; and signing a root of the tree with a long-term signature key to form a certificate for the k-time key pair, wherein it least one of the k 1-time key pairs includes an embedded commitment.

22. A method as recited in claim 21, wherein the long-term signature key is a key certified by a certification authority.

23. A method as recited in claim 21, where the step of generating employs a Lamport scheme.

24. A method as recited in claim 21, wherein the step of constructing includes forming a binary tree with the k 1-time public keys at leaves of the tree, and giving each interior node in the tree values which are collision resistant hashes of children nodes of said each interior node.

25. A method as recited in claim 24, wherein the collision resistant hashes employ SHA-1.

26. A method to generate k-time key pairs for a signature scheme, the method comprising:
generating k 1-time key pairs;
constructing an TCR authentication tree based on a target collision resistant hash function using k 1-time public keys of the key pairs thus generated to form a k-time public key; and
signing a root of the tree combined with TCR-keys used to build the TCR tree, with a long-term signature key of a signer to form a certificate for at least one of the k-time key pairs.

27. A method as recited in claim 26, wherein the step of generating includes k 1-time key pairs that have a public key with an embedded commitment to an enhancing key, and have a private key which includes an enhancing key.

28. A method as recited in claim 26, further comprising storing the generated key pairs and each certificate.

29. A method as recited in claim 26, further comprising storing the TCR tree.

30. A method as recited in claim 26, further comprising storing intermediate values obtained during the step of generating.

31. A method as recited in claim 26, wherein each certificate formed in the step of signing forms a signature and the signature includes information being signed by the signature.

32. A method as recited in claim 31, further comprising extracting the information from the signature.

33. A method as recited in claim 31, further comprising verifying the signature.

34. A method for signing at least one arbitrary message, employing a k-time key pair generated as recited in claim 27, the method of signing comprising:
choosing a unique key pair taken from said 1-time key pairs;
computing a TCR hash function of said at least one arbitrary message using the enhancing key corresponding to the unique 1-time key;
computing a 1-time signature on an output of said TCR hash function;
a commitment opening string to the commitment included within a public key of the unique 1-time key; and
forming a signature comprised of the 1-time signature, the commitment opening string.

35. A method as recited in claim 34, further comprising the step of creating ancillary information for identifying and authenticating the unique 1-time public key within the certificate for the k-time public key; and
including said ancillary information in the signature.

36. A method for verifying a signature on an arbitrary message, wherein the signature is formed according to method recited in claim 34, the method of verifying comprising:
obtaining a authentic copy of the 1-time public key associated with said signature;
extracting the commitment opening string from said signature;
deriving the enhancing key using the commitment opening string;
computing a TCR hash function for the arbitrary message using said enhancing key;
verifying the commitment opening string with respect to the commitment embedded in the 1-time public key; and
verifying the 1-time signature which signed an output of said TCR hash function with respect to the 1-time public key.

37. A method as recited in claim 36, wherein the step of deriving the enhancing key from the commitment opening string includes applying an identity transformation to the commitment opening string.

38. A method as recited in claim 35, wherein the step of verifying the commitment opening string includes computing a function on the 1-time public key and the commitment opening string.

39. A method as recited in claim 35, wherein the step of verifying the 1-time signature includes applying a function on the 1-time signature on said output of the TCR hash function and on said 1-time public key.

40. A method for verifying a signature on an arbitrary message, wherein the signature is formed according to the method recited in claim 35, the method for verifying comprising:
obtaining a certificate for the k-time public key associated with said signature;
verifying the certificate using a long term public key of the signer to authenticate the k-time public key;
extracting the commitment opening string from said signature and using the opening string to derive the enhancing key;
computing a TCR hash function on said message using said enhancing key;
verifying the commitment opening string with respect to a commitment embedded in one of the 1-time public keys within the k-time public key;
verifying the 1-time signature on a output of said TCR hash function with respect to one of the 1-time public keys embedded within the k-time public key; and
validating the ancillary information with respect to the authenticated k-time public key to authenticate the 1-time public key associated with said signature.

41. A method as recited in claim 40, wherein the step of verifying the certificate is performed only once for k uses of the k-time key.

42. A method as recited in claim 39, wherein the step of validating the ancillary information includes the step of partially reconstructing the TCR-tree used to create the k-time public key.

43. An article of manufacture comprising a computer usable medium having computer readable program code means embodied therein for causing generation of a signature for a message, the computer readable program code means in said article of manufacture comprising computer readable program code means for causing a computer to effect:
employing a public/private key pair in which the private key includes at least one enhancing key and the public key includes a TCR commitment to said at least one enhancing key;
obtaining an opening string,
opening the TCR-commitment to said enhancing key with the opening string, forming a function of the message and the private key, and forming a signature comprising the function and the opening string.

44. An article of manufacture as recited in claim 43, wherein the opening string includes the enhancing key.

45. An article of manufacture as recited in claim 43, the computer readable program code means in said article of manufacture further comprising computer readable program code means for causing a computer to effect combining the signature with the message to form a signed message.

46. An article of manufacture as recited in claim 45, wherein the step of combining comprises including the message in the signature.

47. An article of manufacture as recited in claim 43, wherein the signed message includes a certificate.

48. An article of manufacture comprising a computer usable medium having computer readable program code means embodied therein, the computer readable program code means in said article of manufacture comprising computer readable program code means for causing a computer to effect:
   receiving a signed message having an internal message, a signature, and a commitment opening string, and
   authenticating the internal message employing a public key from a public/private key pair in which the public key includes a TCR-commitment to an enhancing key and the private key includes at least one enhancing key.

49. An article of manufacture as recited in claim 48, the computer readable program code means in said article of manufacture further comprising computer readable program code means for causing a computer to effect extracting the internal message from the signed message.

50. An article of manufacture as recited in claim 49, the computer readable program code means in said article of manufacture further comprising computer readable program code means for causing a computer to effect extracting the opening string from the signed message and verifying the validity of the opening string with respect of the TCR-commitment made to an enhancing string in the public key.

51. An article of manufacture as recited in claim 50, the computer readable program code means in said article of manufacture further comprising computer readable program code means for causing a computer to effect verifying validity of the opening string with respect to the TCR-commitment by a computing function using a certificate for the public key.

52. An article of manufacture as recited in claim 48, the computer readable program code means in said article of manufacture further comprising computer readable program code means for causing a computer to effect the step of extracting the signature from the signed message.

53. An article of manufacture as recited in claim 51, wherein the TCR-commitment is a regular commitment.

54. An article of manufacture as recited in claim 51, the computer readable program code means in said article of manufacture further comprising computer readable program code means for causing a computer to effect employing the signature in an enhanced commitment based signature scheme.

55. An article of manufacture as recited in claim 51, the computer readable program code means in said article of manufacture further comprising computer readable program code means for causing a computer to effect verifying a purported signature.

56. A computer program product comprising a computer usable medium having computer readable program code means embodied therein for causing a generation of a signature for an internal message, the computer readable program code means in said computer program product comprising computer readable program code means for causing a computer to effect:
   generating a signature for an internal message employing a private key which includes at least one enhancing key and which is paired with a public key which includes a commitment to said enhancing key;
   opening the commitment to said enhancing key and obtaining an opening string;
   forming a function of the internal message and the private key; and
   forming the signature comprising the function and the opening string.

57. A computer program product as recited in claim 56, wherein the opening string includes the enhancing key.

58. A computer program product as recited in claim 56, the computer readable program code means in said computer program product further comprising computer readable program code means for causing a computer to effect combining the signature with the internal message to form a signed message.

59. A program storage device readable by machine, tangibly embodying a program of instructions executable by the machine to perform method steps for a signer to generate key pairs for a signature scheme, said method steps comprising:
   generating k 1-time key pairs;
   constructing an authentication tree based on a collision resistant hash function using the k, 1-time public keys of the key pairs thus generated to form a k-time public key; and
   signing a root of the tree with a long-term signature key to form a certificate for the k-time key pair;
   wherein at least one of the k 1-time key pairs includes an embedded commitment.

60. A program storage device readable by machine as recited in claim 59, wherein the step of generating employs a Merkle scheme.

61. A program storage device readable by machine as recited in claim 59, wherein the step of constructing includes forming a binary tree with the k 1-time public keys at leaves of the tree, and giving each interior node in the tree values which are collision resistant hashes of children nodes of said each interior node.

62. A program storage device readable by machine, tangibly embodying a program of instructions executable by the machine to perform method steps for generating k-time key pairs for a signature scheme, said method steps comprising:
   generating k 1-time key pairs;
   constructing an TCR authentication tree based on a target collision resistant hash function using k 1-time public keys of the key pairs thus generated to form a k-time public key; and
   signing a root of the tree combined with TCR-keys used to build the TCR tree, with a long-term signature key of a signer to form a certificate for at least one of the k-time key pairs.

63. A program storage device readable by machine as recited in claim 62, wherein the step of generating includes k 1-time key pairs that have a public key with an embedded commitment to an enhancing key, and have a private key which includes an enhancing key.

64. A program storage device readable by machine as recited in claim 62, said method steps further comprising storing the generated key pairs and each certificate.

65. A program storage device readable by machine as recited in claim 62, said method steps further comprising storing intermediate values obtained during the step of generating.

66. A program storage device readable by machine, tangibly embodying a program of instructions executable by the machine to perform method steps for signing at least one arbitrary message,
employing a k-time key pair generated as recited in claim 63, said method steps for signing comprising:
choosing a unique key pair taken from said 1-time key pairs;
computing a TCR hash function of said at least one arbitrary message using the enhancing key corresponding to the unique 1-time key;
computing a 1-time signature on an output of said TCR hash function;
computing a commitment opening string to the commitment included within a public key of the unique 1-time key; and
forming a signature comprised of the 1-time signature, the commitment opening string.

67. A program storage device readable by machine as recited in claim 66, said method steps further comprising the steps of creating ancillary information for identifying and authenticating the unique 1-time public key within the certificate for the k-time public key; and
including the ancillary information in the signature.

68. A program storage device readable by machine, tangibly embodying a program of instructions executable by the machine to perform method steps for verifying a signature on an arbitrary message, wherein the signature is formed according to method recited in claim 66, said method steps for verifying comprising:
obtaining a authentic copy of the 1-time public key associated with said signature;
extracting the commitment opening string from said signature;
deriving the enhancing key using the commitment opening string;
computing a TCR hash function for the arbitrary message using said enhancing key;
verifying the commitment opening string with respect to the commitment embedded in the 1-time public key; and
verifying the 1-time signature which signed an output of said TCR hash function with respect to the 1-time public key.

69. A program storage device readable by machine as recited in claim 62, wherein the signature scheme is a 36-time signature scheme.

70. A method as recited in claim 1, further comprising steps of a 36-time signature scheme.

71. A program storage device readable by machine as recited in claim 61, wherein the collision resistant hashes employ MD-5.

* * * * *